US010601643B2

(12) United States Patent
Zhang et al.

(10) Patent No.: US 10,601,643 B2
(45) Date of Patent: Mar. 24, 2020

(54) TROUBLESHOOTING METHOD AND APPARATUS USING KEY PERFORMANCE INDICATOR INFORMATION

(71) Applicant: Huawei Technologies Co., Ltd., Shenzhen (CN)

(72) Inventors: Wenge Zhang, Shenzhen (CN); Ridong Xu, Shenzhen (CN); Yong Chen, Xi'an (CN); Qingming Liu, Shenzhen (CN); Taizhou Chen, Shenzhen (CN); Fuxiang Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 57 days.

(21) Appl. No.: 15/928,367

(22) Filed: Mar. 22, 2018

(65) Prior Publication Data
US 2018/0212819 A1    Jul. 26, 2018

Related U.S. Application Data

(63) Continuation of application No. PCT/CN2016/098344, filed on Sep. 7, 2016.

(30) Foreign Application Priority Data

Sep. 22, 2015 (CN) .......................... 2015 1 0608782

(51) Int. Cl.
*H04L 12/24*    (2006.01)
*H04L 12/26*    (2006.01)

(52) U.S. Cl.
CPC ...... *H04L 41/0677* (2013.01); *H04L 41/0668* (2013.01); *H04L 41/0686* (2013.01);
(Continued)

(58) Field of Classification Search
CPC ............. H04L 41/0677; H04L 43/0817; H04L 41/0686; H04L 41/0893; H04L 41/0668; H04L 43/10; H04L 43/16; H04L 41/0654
See application file for complete search history.

(56) References Cited

U.S. PATENT DOCUMENTS 10,284,434 B1 *   5/2019   Rajagopal ............... H04L 43/08
2009/0092374 A1 *   4/2009   Kulas ...................... H04N 7/173
                                                                386/248
(Continued)

FOREIGN PATENT DOCUMENTS

CN          101984697 A        3/2011
CN          102111797 A        6/2011
(Continued)

OTHER PUBLICATIONS

Nakajima, M., et al., "A Study of Element Management System Architecture for Virtualized Carrier Networks," Technical Research Report of Institute of Electronics, Information, and Communication Engineers, ICM2014-32, LOIS2014/59 , vol. 114, No. 389, Jan. 8, 2015, pp. 115-118.

(Continued)

*Primary Examiner* — Tejis Daya
(74) *Attorney, Agent, or Firm* — Conley Rose, P.C.

(57) ABSTRACT

This application provides a troubleshooting method and apparatus. The troubleshooting method includes obtaining key performance indicator (KPI) information of each service processor in a monitored network element; determining a faulty object according to the KPI information; determining a troubleshooting policy according to the faulty object; and sending the troubleshooting policy to a management unit in a network function virtualization (NFV) system, so that the management unit uses the troubleshooting policy to perform troubleshooting. Using the method or apparatus in this (Continued)

application, a problem of relatively low precision in fault locating according to a heartbeat message of a network element can be resolved.

14 Claims, 5 Drawing Sheets

(52) U.S. Cl.
CPC ...... *H04L 41/0893* (2013.01); *H04L 43/0817* (2013.01); *H04L 43/10* (2013.01); *H04L 43/16* (2013.01)

(56) References Cited

U.S. PATENT DOCUMENTS

| | | | |
|---|---|---|---|
| 2011/0122761 | A1 | 5/2011 | Sriram |
| 2015/0082308 | A1* | 3/2015 | Kiess .................... G06F 9/5072 718/1 |
| 2015/0113133 | A1* | 4/2015 | Srinivas .............. H04L 41/0816 709/224 |
| 2015/0281004 | A1* | 10/2015 | Kakadia ................ H04L 41/147 370/235 |
| 2016/0103888 | A1* | 4/2016 | Fletcher .............. H04L 41/5009 707/722 |
| 2016/0112275 | A1* | 4/2016 | Park ...................... H04L 41/147 709/224 |
| 2016/0149771 | A1 | 5/2016 | Prasad et al. |
| 2016/0224409 | A1 | 8/2016 | Liu et al. |
| 2016/0330067 | A1* | 11/2016 | Liu ........................ H04W 24/04 |
| 2016/0330111 | A1* | 11/2016 | Manghirmalani .... H04L 43/028 |
| 2016/0335111 | A1 | 11/2016 | Bruun et al. |
| 2018/0083850 | A1* | 3/2018 | Rabipour ............... H04L 43/022 |
| 2018/0176088 | A1* | 6/2018 | Ellappan ............. H04L 41/0893 |

FOREIGN PATENT DOCUMENTS

| | | |
|---|---|---|
| CN | 102158360 A | 8/2011 |
| CN | 103457792 A | 12/2013 |
| CN | 104468688 A | 3/2015 |
| CN | 104796277 A | 7/2015 |
| CN | 105187249 A | 12/2015 |
| WO | 2015042937 A1 | 4/2015 |
| WO | 2015061353 A1 | 4/2015 |
| WO | 2015109443 A1 | 7/2015 |
| WO | 2015126430 A1 | 8/2015 |

OTHER PUBLICATIONS

Foreign Communication From a Counterpart Application, Japanese Application No. 2018-514977, Japanese Office Action dated Mar. 12, 2019, 2 pages.
Foreign Communication From a Counterpart Application, Japanese Application No. 2018-514977, English Translation of Japanese Office Action dated Mar. 12, 2019, 2 pages.
Machine Translation and Abstract of Chinese Publication No. CN101984697, Mar. 9, 2011, 12 pages.
Machine Translation and Abstract of Chinese Publication No. CN102111797, Jun. 29, 2011, 23 pages.
Machine Translation and Abstract of Chinese Publication No. CN102158360, Aug. 17, 2011, 16 pages.
Machine Translation and Abstract of Chinese Publication No. CN103457792, Dec. 18, 2013, 27 pages.
Machine Translation and Abstract of Chinese Publication No. CN104796277, Jul. 22, 2015, 19 pages.
Machine Translation and Abstract of Chinese Publication No. CN105187249, Dec. 23, 2015, 27 pages.
Foreign Communication From a Counterpart Application, Chinese Application No. 20151068782.1, Chinese Office Action dated Dec. 1, 2017, 8 pages.
Foreign Communication From a Counterpart Application, PCT Application No. PCT/CN2016/098344, English Translation of International Search Report dated Nov. 25, 2016, 2 pages.
Foreign Communication From a Counterpart Application, PCT Application No. PCT/CN2016/098344, English Translation of Written Opinion dated Nov. 25, 2016, 6 pages.
Foreign Communication From a Counterpart Application, European Application No. 16848012.7, Extended European Search Report dated Jun. 27, 2018, 8 pages.

* cited by examiner

TROUBLESHOOTING METHOD AND APPARATUS USING KEY PERFORMANCE INDICATOR INFORMATION

CROSS-REFERENCE TO RELATED APPLICATIONS

This application is a continuation of International Application No. PCT/CN2016/098344, filed on Sep. 7, 2016, which claims priority to Chinese Patent Application No. 201510608782.1, filed on Sep. 22, 2015, both of which are hereby incorporated by reference in their entireties.

TECHNICAL FIELD

This application relates to the network data processing field, and in particular, to a troubleshooting method and apparatus.

BACKGROUND

In a communications system, when a fault occurs on a device, a method is needed to troubleshoot the fault, so as to avoid severe impact on performance of the communications system caused when the fault cannot be troubleshot for a long time.

A troubleshooting method may be manually performed. However, manually detecting a fault and then troubleshooting the fault usually lead to relatively high time and labor costs. Therefore, the industry gradually expects a device in a communications system to automatically troubleshoot a fault in the communications system, so as to improve troubleshooting efficiency and reduce labor costs.

In a troubleshooting method in the prior art, whether a device becomes faulty is mainly determined according to a heartbeat message of the device. A monitoring device may periodically send a heartbeat message to a monitored device, and after receiving the heartbeat message, the monitored device may return a response message to the monitoring device. If the monitoring device has not received, within a specified time after sending the heartbeat message, the response message returned by the monitored device, it is determined that the monitored device becomes faulty, and further, the entire monitored device is reset or a function carried by the monitored device is switched to another device for troubleshooting.

However, there may be multiple causes why the monitoring device has not received the response message within the specified time. For example, the cause may be that an interface unit used by the monitored device to send the response message becomes faulty. In this case, another interface unit of the monitored device may be invoked to replace the interface unit without resetting the entire monitored device or function switching. Resetting the entire monitored device or function switching causes relatively high risks, and affects a relatively large quantity of services.

In conclusion, in the troubleshooting method in the prior art, a fault is analyzed and troubleshot according to a heartbeat message of a device, causing relatively low precision in fault locating.

SUMMARY

The objective of this application is to provide a troubleshooting method and apparatus, to locate a fault using key performance indicator (KPI) information, to resolve a problem of relatively low precision in fault locating according to a heartbeat message of a device.

To implement the foregoing objective, this application provides the following solutions.

According to a first possible implementation of a first aspect of this application, this application provides a troubleshooting method, including obtaining KPI information of each service processing unit in a monitored network element; determining a faulty object according to the KPI information; determining a troubleshooting policy according to the faulty object; and sending the troubleshooting policy to a management unit in a network function virtualization (NFV) system, so that the management unit uses the troubleshooting policy to perform troubleshooting.

With reference to a second possible implementation of the first aspect, the determining a faulty object includes determining that the faulty object is a service processing unit in the monitored network element; or determining that the faulty object is a communication path between the service processing units; and the determining a troubleshooting policy according to the faulty object includes, when the faulty object is the service processing unit in the monitored network element or the communication path between the service processing units, determining a network-element-level troubleshooting policy, where the network-element-level troubleshooting policy is used to perform a troubleshooting operation inside the monitored network element.

With reference to a third possible implementation of the first aspect, the determining a faulty object includes determining that the faulty object is the monitored network element; or determining that the faulty object is a communication path between the monitored network element and another network element; and the determining a troubleshooting policy according to the faulty object includes, when the faulty object is the monitored network element or the communication path between the monitored network element and the another network element, determining a network-level troubleshooting policy, where the network-level troubleshooting policy is used to perform a troubleshooting operation on one or more network elements in a network in which the monitored network element is located.

With reference to a first specific implementation of the second possible implementation of the first aspect, the determining that the faulty object is a service processing unit in the monitored network element includes calculating, according to a quantity of service requests, received by a service processing unit, in the KPI information, and a quantity of service failures that is corresponding to the quantity of service requests and is in the KPI information, a service success rate of a service performed by a service processing unit; comparing the service success rate with a first reference value; and determining that a service processing unit whose service success rate is lower than the first reference value is the faulty object.

With reference to a first more specific implementation of the first specific implementation of the second possible implementation of the first aspect, the comparing the service success rate with a first reference value includes comparing the service success rate with a preset reference value; or determining an average service success rate of a homogenized service processing unit; subtracting a preset value from the average service success rate to obtain a homogenized reference value; and comparing the service success rate with the homogenized reference value; where the homogenized service processing unit is a service processing unit that has same service logic as that of a service carried by the service processing unit, and to which the service is discretely allocated.

With reference to a second more specific implementation of the first specific implementation of the second possible implementation of the first aspect, before the determining that a service processing unit whose service success rate is lower than the first reference value is the faulty object, the method further includes determining a first unit set, whose service success rate is greater than the first reference value, in homogenized service processing units; determining a second unit set, whose service success rate is less than the first reference value, in the homogenized service processing units; and determining that a percentage of units included in the first unit set in all the homogenized service processing units is greater than a first preset percentage; where the homogenized service processing unit is a service processing unit that has same service logic as that of a service carried by the service processing unit, and to which the service is discretely allocated.

With reference to a second specific implementation of the second possible implementation of the first aspect, the determining that the faulty object is a communication path between the service processing units includes calculating a service success rate of a communication path according to a quantity that is of service failures caused by a communication path fault and is in the KPI information; comparing the service success rate with a third reference value; and determining that a communication path whose service success rate is lower than the third reference value is the faulty object.

With reference to a first specific implementation of the third possible implementation of the first aspect, the determining that the faulty object is the monitored network element includes collecting statistics about a service success rate of each service processing unit according to a quantity of service requests, received by each service processing unit, in the KPI information of each service processing unit, and a quantity of service failures that is corresponding to the quantity of service requests and is in the KPI information of each service processing unit; comparing the service success rate with a second reference value; determining a quantity of service processing units whose service success rates are lower than the second reference value; determining, according to the quantity, a percentage of the service processing units, whose service success rates are lower than the second reference value, in all service processing units in the monitored network element; and when the percentage is greater than a second preset percentage, determining that the monitored network element is the faulty object.

With reference to a first more specific implementation of the first specific implementation of the third possible implementation of the first aspect, the comparing the service success rate with a second reference value includes comparing the service success rate with a preset reference value; or determining an average service success rate of a homogenized network element; subtracting a preset value from the average service success rate to obtain a homogenized reference value; and comparing the service success rate with the homogenized reference value; where the homogenized network element is a monitored network element that carries a service with same service logic as that of the monitored network element, and to which the service is discretely allocated.

With reference to a third specific implementation of the second possible implementation of the first aspect, after the determining that the faulty object is a service processing unit in the monitored network element or after the determining that the faulty object is a communication path between the service processing units, the sending the troubleshooting policy to a management unit in a NFV system includes sending the troubleshooting policy to a system management module in the monitored network element in the NFV system.

With reference to a second specific implementation of the third possible implementation of the first aspect, after the determining that the faulty object is the monitored network element or after the determining that the faulty object is a communication path between the monitored network element and another network element, the sending the troubleshooting policy to a management unit in a NFV system includes sending the troubleshooting policy to a management and orchestration (MANO) unit in the NFV system.

With reference to a fourth specific implementation of the second possible implementation of the first aspect, after the determining that the faulty object is a service processing unit in the monitored network element, the method further includes determining that a quantity of faulty service processing units reaches a preset threshold; and determining a network-level troubleshooting policy, where the network-level troubleshooting policy is used to perform a troubleshooting operation on one or more network elements in a network in which the monitored network element is located.

With reference to a third specific implementation of the third possible implementation of the first aspect, the determining a network-level troubleshooting policy includes obtaining status information of a redundancy network element related to the monitored network element that is determined as the faulty object; determining a redundancy network element in a normal operating state according to the status information; and generating network-level troubleshooting indication information, where the troubleshooting indication information is used to instruct the management unit to replace, with the redundancy network element in the normal operating state, the monitored network element that is determined as the faulty object; or the determining a network-level troubleshooting policy includes obtaining status information of a redundancy network element of a back-end network element in the communication path that is determined as the faulty object; determining a redundancy network element in a normal operating state according to the status information; and generating network-level troubleshooting indication information, where the troubleshooting indication information is used to instruct the management unit to switch the back-end network element corresponding to a front-end network element in the communication path to the redundancy network element in the normal operating state.

According to a first possible implementation of a second aspect of this application, this application provides a troubleshooting apparatus, including an obtaining unit configured to obtain KPI information of each service processing unit in a monitored network element; a determining unit configured to determine a faulty object according to the KPI information; and determine a troubleshooting policy according to the faulty object; and a sending unit configured to send the troubleshooting policy to a management unit in a NFV system, so that the management unit uses the troubleshooting policy to perform troubleshooting.

With reference to a second possible implementation of the second aspect, the determining unit is configured to determine that the faulty object is a service processing unit in the monitored network element; or determine that the faulty object is a communication path between the service processing units; and when the faulty object is the service processing unit in the monitored network element or the communication path between the service processing units, determine a network-element-level troubleshooting policy, where the network-element-level troubleshooting policy is used to perform a troubleshooting operation inside the monitored network element.

With reference to a third possible implementation of the second aspect, the determining unit is configured to determine that the faulty object is the monitored network element; or determine that the faulty object is a communication path between the monitored network element and another network element; and when the faulty object is the monitored network element or the communication path between the monitored network element and the another network element, determine a network-level troubleshooting policy, where the network-level troubleshooting policy is used to perform a troubleshooting operation on one or more network elements in a network in which the monitored network element is located.

With reference to a first specific implementation of the second possible implementation of the second aspect, the determining unit is configured to calculate, according to a quantity of service requests, received by a service processing unit, in the KPI information, and a quantity of service failures that is corresponding to the quantity of service requests and is in the KPI information, a service success rate of a service performed by a service processing unit; compare the service success rate with a first reference value; and determine that a service processing unit whose service success rate is lower than the first reference value is the faulty object.

With reference to a first more specific implementation of the first specific implementation of the second possible implementation of the second aspect, the determining unit is configured to compare the service success rate with a preset reference value; or determine an average service success rate of a homogenized service processing unit; subtract a preset value from the average service success rate to obtain a homogenized reference value; and compare the service success rate with the homogenized reference value; where the homogenized service processing unit is a service processing unit that has same service logic as that of a service carried by the service processing unit, and to which the service is discretely allocated.

With reference to a second more specific implementation of the first specific implementation of the second possible implementation of the second aspect, the determining unit is further configured to, before determining that the service processing unit whose service success rate is lower than the first reference value is the faulty object, determine a first unit set, whose service success rate is greater than the first reference value, in homogenized service processing units; determine a second unit set, whose service success rate is less than the first reference value, in the homogenized service processing units; and determine that a percentage of units included in the first unit set in all the homogenized service processing units is greater than a first preset percentage; where the homogenized service processing unit is a service processing unit that has same service logic as that of a service carried by the service processing unit, and to which the service is discretely allocated.

With reference to a second specific implementation of the second possible implementation of the second aspect, the determining unit is configured to calculate a service success rate of a communication path according to a quantity that is of service failures caused by a communication path fault and is in the KPI information; compare the service success rate with a third reference value; and determine that a communication path whose service success rate is lower than the third reference value is the faulty object.

With reference to a first specific implementation of the third possible implementation of the second aspect, the determining unit is configured to collect statistics about a service success rate of each service processing unit according to a quantity of service requests, received by each service processing unit, in the KPI information of each service processing unit, and a quantity of service failures that is corresponding to the quantity of service requests and is in the KPI information of each service processing unit; compare the service success rate with a second reference value; determine a quantity of service processing units whose service success rates are lower than the second reference value; determine, according to the quantity, a percentage of the service processing units, whose service success rates are lower than the second reference value, in all service processing units in the monitored network element; and when the percentage is greater than a second preset percentage, determine that the monitored network element is the faulty object.

With reference to a first more specific implementation of the first specific implementation of the third possible implementation of the second aspect, the determining unit is configured to compare the service success rate with a preset reference value; or determine an average service success rate of a homogenized network element; subtract a preset value from the average service success rate to obtain a homogenized reference value; and compare the service success rate with the homogenized reference value; where the homogenized network element is a monitored network element that carries a service with same service logic as that of the monitored network element, and to which the service is discretely allocated.

With reference to a third specific implementation of the second possible implementation of the second aspect, the sending unit is configured to, after it is determined that the faulty object is the service processing unit in the monitored network element or after it is determined that the faulty object is the communication path between the service processing units, send the troubleshooting policy to a system management module in the monitored network element in the NFV system.

With reference to a second specific implementation of the third possible implementation of the second aspect, the sending unit is configured to, after it is determined that the faulty object is the monitored network element or after it is determined that the faulty object is the communication path between the monitored network element and the another network element, send the troubleshooting policy to a MANO unit in the NFV system.

With reference to a fourth specific implementation of the second possible implementation of the second aspect, the determining unit is further configured to, after determining that the faulty object is the service processing unit in the monitored network element, determine that a quantity of faulty service processing units reaches a preset threshold; and determine a network-level troubleshooting policy, where the network-level troubleshooting policy is used to perform a troubleshooting operation on one or more network elements in a network in which the monitored network element is located.

With reference to a third specific implementation of the third possible implementation of the second aspect, the obtaining unit is further configured to obtain status information of a redundancy network element related to the monitored network element that is determined as the faulty object; and the determining unit is further configured to determine a redundancy network element in a normal operating state according to the status information; and generate network-level troubleshooting indication information, where the troubleshooting indication information is used to instruct the management unit to replace, with the redundancy network element in the normal operating state, the monitored network element that is determined as the faulty object; or the obtaining unit is further configured to obtain status information of a redundancy network element of a back-end network element in the communication path that is determined as the faulty object; and the determining unit is further configured to determine a redundancy network element in a normal operating state according to the status information; and generate network-level troubleshooting indication information, where the troubleshooting indication information is used to instruct the management unit to switch the back-end network element corresponding to a front-end network element in the communication path to the redundancy network element in the normal operating state.

According to specific embodiments provided in this application, this application discloses the following technical effects.

According to the troubleshooting method or apparatus disclosed in this application, KPI information of each service processing unit in a monitored network element is obtained; a faulty object is determined according to the KPI information; a troubleshooting policy is determined according to the faulty object; and the troubleshooting policy is sent to a management unit in a NFV system. A fault can be located using the KPI information, thereby resolving a problem of relatively low precision in fault locating according to a heartbeat message of a network element.

In addition, the troubleshooting policy is determined according to the faulty object, and the troubleshooting policy is sent to the management unit in the NFV system. Therefore, an appropriate troubleshooting policy can be used, which reduces risks caused during a troubleshooting process and mitigates impact on a service during the troubleshooting process.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

To make the objectives, features and advantages of this application more comprehensible, this application is further illustrated in detail in the following with reference to the accompanying drawings and specific embodiments.

Figure 1:
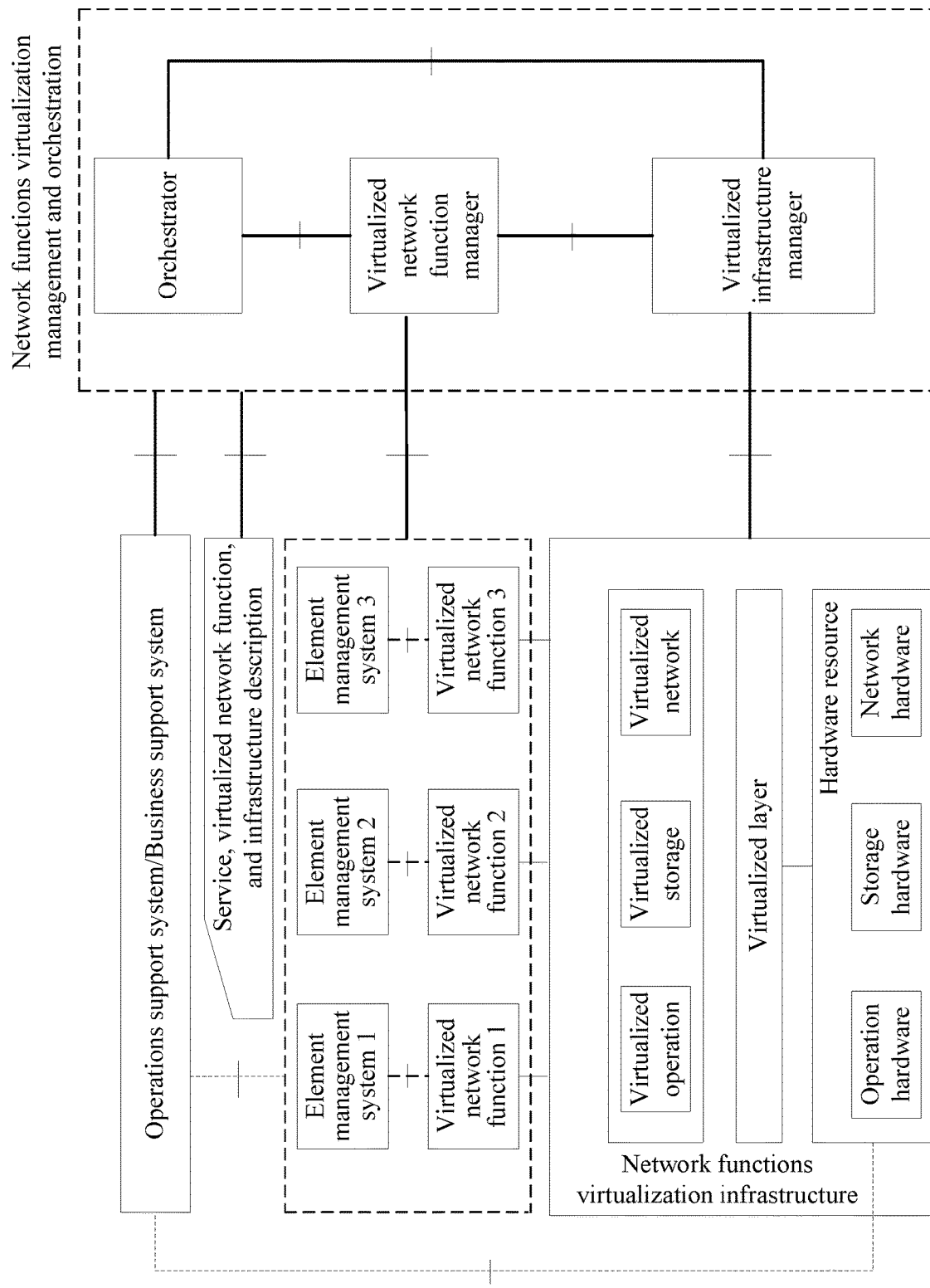
FIG. 1 is an architectural diagram of a NFV system according to this application.

FIG. 1 is an architectural diagram of a NFV system according to this application. A troubleshooting method in this application is mainly applied to the NFV system. As shown in FIG. 1, the NFV system mainly includes the following network elements: an operations support system (OSS)/a business support system (BSS) configured to initiate a service request to a network functions virtualization orchestrator (NFV Orchestrator) and provide a resource required for a service, and responsible for fault processing; the orchestrator, responsible for implementing an NFV service according to the service request of the OSS/BSS; and responsible for lifecycle management of a network service (NS), and for orchestrating a management resource and monitoring, in real time, resources and running status information of a virtualized network function (VNF) and a network functions virtualization infrastructure (NFVI); a virtualized network function manager (VNFM), responsible for VNF generation period management, for example, management of starting, time to live, and VNF running status information; a virtualized infrastructure manager (VIM), responsible for managing and allocating an NFVI resource, and for monitoring and collecting NFVI running status information; and an element management system (EMS), responsible (Fault Management, Configuration Management, Accounting Management, Performance Management, Security Management (FCAPS) management of a network element.

The NFVI resource includes all NFVI resources: available/reserved/allocated NFVI resources.

The troubleshooting method in this application may be performed by a network element KPI monitoring and troubleshooting decision module or the network KPI monitoring and troubleshooting decision module. The network element KPI monitoring and troubleshooting decision module or a network KPI monitoring and troubleshooting decision module may be deployed in a VNF, an EMS, or a MANO unit in the NFV system, or in an independent network node. The network element KPI monitoring and troubleshooting decision module and the network KPI monitoring and troubleshooting decision module may be deployed in an integrated manner or deployed separately.

Figure 2:
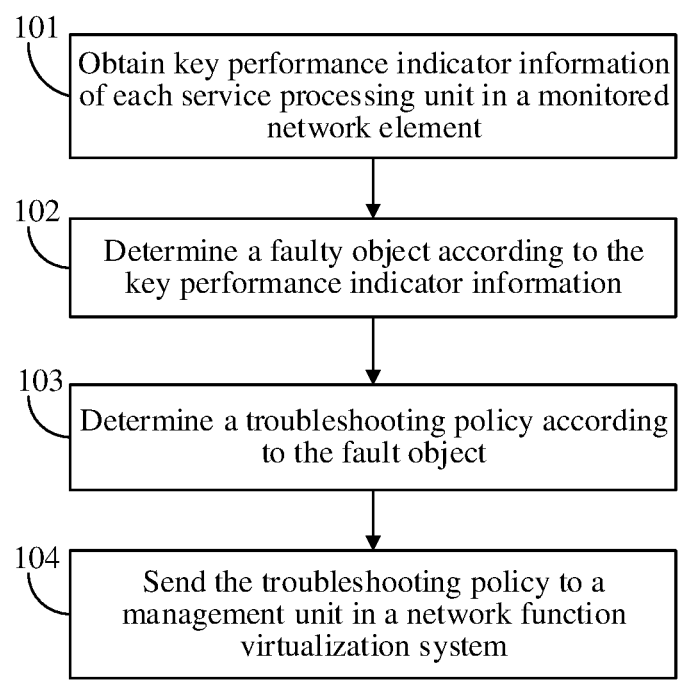
FIG. 2 is a flowchart of Embodiment 1 of a troubleshooting method according to this application.

FIG. 2 is a flowchart of Embodiment 1 of a troubleshooting method according to this application. The method in this embodiment may be performed by a network element KPI monitoring and troubleshooting decision module or a network KPI monitoring and troubleshooting decision module. As shown in FIG. 2, the method may include the following steps.

Step 101: Obtain KPI information of each service processing unit in a monitored network element.

The monitored network element may be a network element in a NFV system, for example, a VNF.

There may be one or more service processing units in the monitored network element.

The KPI information may include information such as a quantity of service requests received by a service processing unit, a quantity of service failures corresponding to the quantity of service requests, and/or a cause of each service failure. In actual application, an information type included in the KPI information may be set according to a requirement. For example, the KPI information may further include information such as service delay information.

The monitored network element may periodically report the KPI information.

It should be noted that before step 101 is performed, a network element that needs to be monitored may be further determined according to information about an EMS and/or a MANO. Information about a service processing unit deployed inside a network element, and information about a network element deployed in a network that is recorded by the EMS and/or the MANO may be obtained. A network element corresponding to the recorded information about the network element deployed in the network is determined as the monitored network element. A service processing unit corresponding to the recorded information about the service processing unit deployed inside the network element is determined as a service processing unit that needs to be monitored.

Step 102: Determine a faulty object according to the KPI information.

For example, a success rate of a service performed by a service processing unit may be calculated according to the KPI information. When the success rate is lower than a particular rate, it may be determined that the faulty object is the service processing unit. When a quantity of service processing units with relatively low success rates is relatively large (for example, exceeds 80% of a total quantity of service processing units in the monitored network element), it may be determined that the faulty object is a network element other than the monitored network element. For another example, when a quantity, recorded in the KPI information, of service failures caused by a timeout of communication from a monitored network element to a next-hop network element is relatively high, it may be determined that a communication path from the monitored network element to the next-hop network element is faulty or the next-hop network element is faulty.

Step 103: Determine a troubleshooting policy according to the faulty object.

When the faulty object is a service processing unit inside the monitored network element, a network-element-level troubleshooting policy may be determined. The network-element-level troubleshooting policy is used to perform a troubleshooting operation inside the monitored network element.

When the faulty object is a network element other than the monitored network element, a network-level troubleshooting policy may be determined. The network-level troubleshooting policy is used to perform a troubleshooting operation on one or more network elements in a network in which the monitored network element is located.

Step 104: Send the troubleshooting policy to a management unit in a NFV system, so that the management unit uses the troubleshooting policy to perform troubleshooting.

The management unit may be a system management module in the monitored network element in the NFV system, or may be a MANO unit in the NFV system.

Manners of using the network-element-level troubleshooting policy to perform troubleshooting may include the following manners: determining a standby unit of the faulty service processing unit, and switching a service carried by the faulty service processing unit to the standby unit; or resetting the faulty service processing unit; where when the standby unit becomes faulty, the faulty service processing unit and the standby unit may be isolated.

Manners of using the network-level troubleshooting policy to perform troubleshooting may include the following manners: determining a standby network element of the faulty network element; and switching a service carried by the faulty network element to the standby network element; or determining a standby path of the faulty path; and switching a service carried by the faulty path to the standby path; where when it is determined that the standby path becomes faulty, a standby network element of a network element on the standby path side may be further determined; and a service carried by the network element on the standby path side is switched to the standby network element.

In conclusion, in this embodiment, KPI information of each service processing unit in a monitored network element is obtained; a faulty object is determined according to the KPI information; a troubleshooting policy is determined according to the faulty object; and the troubleshooting policy is sent to a management unit in a NFV system. A fault can be located using the KPI information, thereby resolving a problem of relatively low precision in fault locating according to a heartbeat message of a network element. In addition, the troubleshooting policy is determined according to the faulty object, and the troubleshooting policy is sent to the management unit in the NFV system. Therefore, an appropriate troubleshooting policy can be used, which reduces risks caused during a troubleshooting process and mitigates impact on a service during the troubleshooting process.

In actual application, the determining a faulty object may include determining that the faulty object is a service processing unit in the monitored network element; or determining that the faulty object is a communication path between the service processing units.

The determining a troubleshooting policy according to the faulty object may include, when the faulty object is the service processing unit in the monitored network element or the communication path between the service processing units, determining a network-element-level troubleshooting policy, where the network-element-level troubleshooting policy is used to perform a troubleshooting operation inside the monitored network element.

In actual application, the determining a faulty object may further include determining that the faulty object is the monitored network element; or determining that the faulty object is a communication path between the monitored network element and another network element.

The determining a troubleshooting policy according to the faulty object may include, when the faulty object is the monitored network element or the communication path between the monitored network element and the another network element, determining a network-level troubleshooting policy, where the network-level troubleshooting policy is used to perform a troubleshooting operation on one or more network elements in a network in which the monitored network element is located.

It should be noted that based on the method in this embodiment of the present disclosure, in actual application, for a network-element-level fault, a network-element-level troubleshooting policy may be used first to perform troubleshooting; and if the troubleshooting fails, a network-level troubleshooting policy may be used then to perform troubleshooting.

In actual application, the determining that the faulty object is a service processing unit in the monitored network element may include the following steps: calculating, according to a quantity of service requests, received by a service processing unit, in the KPI information, and a quantity of service failures that is corresponding to the quantity of service requests and is in the KPI information, a service success rate of a service performed by a service processing unit; comparing the service success rate with a reference value; and determining that a service processing unit whose service success rate is lower than the reference value is the faulty object.

In the foregoing steps, the quantity of service failures may be a quantity of service failures caused by the service processing unit itself. A cause of a service failure may be recorded in the KPI information, and statistics about the quantity of service failures caused by the service processing unit itself may be collected according to the cause of the service failure.

It should be further noted that in the foregoing steps, the reference value may be a preset value, or may be a homogenized reference value obtained according to statistics about an average service success rate of a homogenized service processing unit. Therefore, the comparing the service success rate with a reference value may include comparing the service success rate with a preset reference value; or determining an average service success rate of a homogenized service processing unit; subtracting a preset value from the average service success rate to obtain a homogenized reference value; and comparing the service success rate with the homogenized reference value; where the homogenized service processing unit is a service processing unit that has same service logic as that of a service carried by the service processing unit, and to which the service is discretely allocated.

It should be noted that the homogenized service processing unit may sometimes encounter the following phenomenon. Service success rates of multiple homogenized service processing units are all lower than the preset reference value due to a reason. In this case, the homogenized service processing units with the service success rates lower than the preset reference value may not be faulty. Service success rates of most homogenized service processing units may be decreased due to a fault of another device. In the foregoing case, to avoid mistakenly determining that the homogenized service processing unit is faulty, before the determining that a service processing unit whose service success rate is lower than the reference value is the faulty object, the following steps may be further used: determining a first unit set, whose service success rate is greater than the preset reference value, in homogenized service processing units; determining a second unit set, whose service success rate is less than the reference value, in the homogenized service processing units; and determining that a percentage of units included in the first unit set in all the homogenized service processing units is greater than a preset percentage.

In the foregoing steps, the preset percentage may be set according to an actual requirement, for example, may be set to 90%. That is, when service success rates of 90% or more of the homogenized service processing units are higher than the preset reference value and service success rates of 10% or less of the homogenized service processing units are lower than the preset reference value, homogenized service processing units with service success rates lower than the reference value may be determined as faulty objects.

In actual application, the determining that the faulty object is a communication path between the service processing units may include calculating a service success rate of a communication path according to a quantity that is of service failures caused by a communication path fault and is in the KPI information; comparing the service success rate with a reference value; and determining that a communication path whose service success rate is lower than the reference value is the faulty object.

In actual application, determining that the faulty object is a network element in a network to which the monitored network element belongs may include collecting statistics about a service success rate of the monitored network element according to a quantity of service requests, received by a service processing unit, in the KPI information, and a quantity of service failures that is corresponding to the quantity of service requests and is in the KPI information; comparing the service success rate with a reference value; and determining that monitored network element whose service success rate is lower than the reference value is the faulty object.

It should be noted that one network element may include multiple service processing units. Therefore, KPI information of each service processing unit in one network element may be obtained; statistics about a quantity of service requests received by the network element and a quantity of service failures corresponding to the quantity of service requests are collected according to a quantity, included in the KPI information of each service processing unit, of service requests received by a service processing unit, and a quantity of service failures that is corresponding to the quantity of service requests and is included in the KPI information of each service processing unit. Further, a service success rate of the monitored network element is calculated.

In actual application, the comparing the service success rate with a reference value may include comparing the service success rate with a preset reference value; or determining an average service success rate of a homogenized network element; subtracting a preset value from the average service success rate to obtain a homogenized reference value; and comparing the service success rate with the homogenized reference value; where the homogenized network element is a monitored network element that carries a service with same service logic as that of the monitored network element, and to which the service is discretely allocated.

Figure 3:
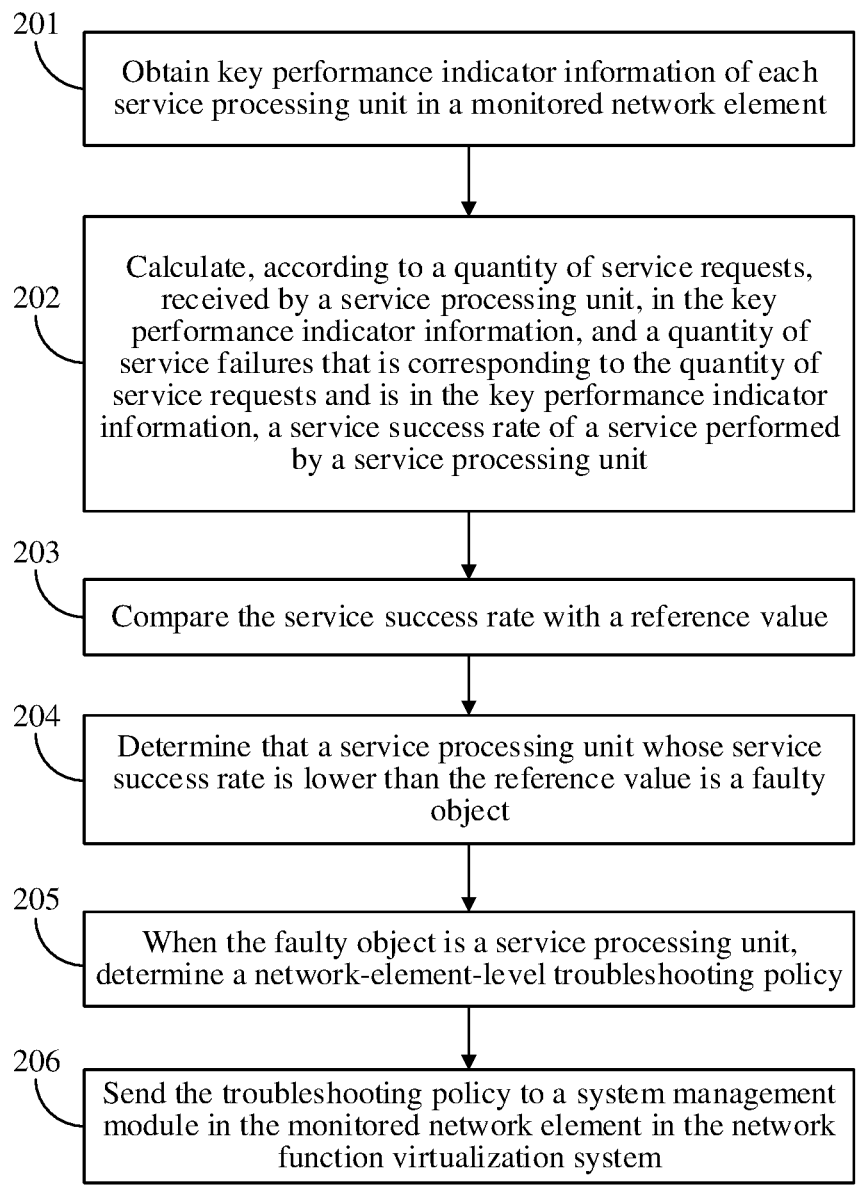
FIG. 3 is a flowchart of Embodiment 2 of a troubleshooting method according to this application.

FIG. 3 is a flowchart of Embodiment 2 of a troubleshooting method according to this application. The method in this embodiment may be performed by a network element KPI monitoring and troubleshooting decision module. As shown in FIG. 3, the method may include the following steps.

Step 201: Obtain KPI information of each service processing unit in a monitored network element.

In this embodiment, the service processing unit may be a thread, a process, a virtual machine (VM), or the like. The KPI information may include at least the following information: a quantity of service requests received by the service processing unit and a quantity of service failures corresponding to the quantity of service requests.

Step 202: Calculate, according to a quantity of service requests, received by a service processing unit, in the KPI information, and a quantity of service failures that is corresponding to the quantity of service requests and is in the KPI information, a service success rate of a service performed by a service processing unit.

The service success rate may be obtained by subtracting the quantity of service failures from the quantity of service requests, then dividing the obtained difference by the quantity of service requests, and multiplying the obtained quotient by 100%.

Step 203: Compare the service success rate with a reference value.

The reference value may be set according to an actual requirement. For example, when a service success rate of a normal service processing unit is 95% or higher, the reference value may be set to 95%.

Alternatively, the reference value may be calculated according to an average service success rate of a homogenized service processing unit. The homogenized service processing unit is a service processing unit that has same service logic as that carried by a service processing unit corresponding to the service success rate, and has same external service networking as that of the service processing unit corresponding to the service success rate. Service request messages received by (distributed to) multiple homogenized service processing units are randomly discrete. Therefore, service success rates of the multiple homogenized service processing units should be basically similar. Therefore, a homogenized reference value may be calculated according to the average service success rate of the homogenized service processing unit.

A preset value may be subtracted from the average service success rate to obtain the homogenized reference value. The preset value may be set according to an actual requirement, for example, may be 20% or 10%.

Step 204: Determine that a service processing unit whose service success rate is lower than the reference value is a faulty object.

Step 205: When the faulty object is a service processing unit, determine a network-element-level troubleshooting policy.

Step 206: Send the troubleshooting policy to a system management module in the monitored network element in a NFV system.

The network-element-level troubleshooting policy in step 205 may instruct the system management module to reset the faulty service processing unit. After receiving the network-element-level troubleshooting policy, the system management module may reset the faulty service processing unit.

It should be noted that if the reset service processing unit is still faulty, the faulty service processing unit may be further isolated. Further, when it is determined that a quantity of isolated service processing units reaches a second preset threshold, a network-level troubleshooting policy may be executed. The network-level troubleshooting policy is used to perform a troubleshooting operation on one or more network elements in a network in which the monitored network element is located. For example, a switchover may be performed on a next-hop faulty network element or communication path of the monitored network element. A target network element or communication path of the switchover may be selected according to health statuses of network elements or communication paths in a redundancy group.

It should be further noted that when the faulty service processing unit is an active/standby service processing unit, the troubleshooting policy may be determining a standby unit of the faulty service processing unit; and switching a service carried by the faulty service processing unit to the standby unit. Further, when the standby unit becomes faulty, the faulty service processing unit and the standby unit may be isolated.

Figure 4:
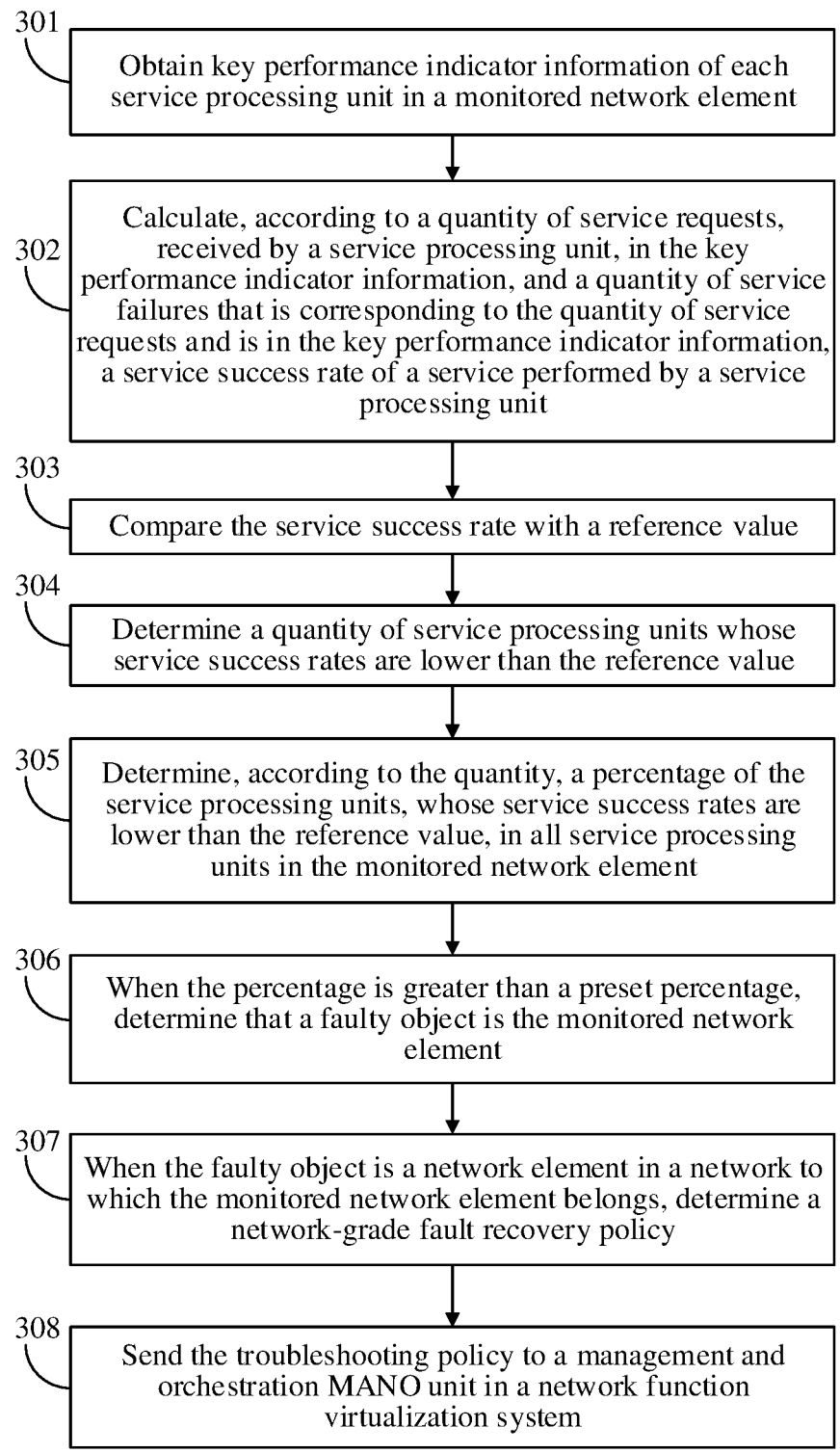
FIG. 4 is a flowchart of Embodiment 3 of a troubleshooting method according to this application.

FIG. 4 is a flowchart of Embodiment 3 of a troubleshooting method according to this application. The method in this embodiment may be performed by a network KPI monitoring and troubleshooting decision module. As shown in FIG. 4, the method may include the following steps.

Step 301: Obtain KPI information of each service processing unit in a monitored network element.

Step 302: Calculate, according to a quantity of service requests, received by a service processing unit, in the KPI information, and a quantity of service failures that is corresponding to the quantity of service requests and is in the KPI information, a service success rate of a service performed by each service processing unit.

Step 303: Compare the service success rate with a reference value.

Step 304: Determine a quantity of service processing units whose service success rates are lower than the reference value.

Step 305: Determine, according to the quantity, a percentage of the service processing units, whose service success rates are lower than the reference value, in all service processing units in the monitored network element.

Assuming that the quantity of the service processing units whose service success rates are lower than the reference value is 8 and that a quantity of all the service processing units in the monitored network element is 10, the percentage is 80%.

Step 306: When the percentage is greater than a preset percentage, determine that a faulty object is the monitored network element.

The preset percentage may be set according to an actual requirement. For example, the preset percentage may be set to 50% or 80%.

Step 307: When the faulty object is a network element in a network to which the monitored network element belongs, determine a network-level troubleshooting policy.

When a fault location is the network element in the network to which the monitored network element belongs, the network-level troubleshooting policy needs to be used, to repair the faulty network element.

In actual application, the determining a network-level troubleshooting policy may be implemented in multiple manners. For example, the following steps may be used: obtaining status information of a redundancy network element related to the monitored network element that is determined as the faulty object; determining a redundancy network element in a normal operating state according to the status information; and generating network-level troubleshooting indication information, where the troubleshooting indication information is used to instruct a management unit to replace, with the redundancy network element in the normal operating state, the monitored network element that is determined as the faulty object.

In the foregoing steps, it can be ensured that the redundancy network element used to replace the faulty monitored network element can operate normally. If all redundancy network elements of the monitored network element are abnormal, a preset redundancy network element may not be used to replace the faulty monitored network element, and another network element that can operate normally may be found, to replace the faulty monitored network element.

For another example, the following steps may be used: obtaining status information of a redundancy network element of a back-end network element in a communication path that is determined as the faulty object; determining a redundancy network element in a normal operating state according to the status information; and generating network-level troubleshooting indication information, where the troubleshooting indication information is used to instruct the management unit to switch the back-end network element corresponding to a front-end network element in the communication path to the redundancy network element in the normal operating state.

In the foregoing steps, it can be ensured that the switched-to redundancy network element can operate normally. If all redundancy network elements of the back-end network element in the communication path are abnormal, a preset redundancy network element may not be used for the switchover, and another network element that can operate normally may be found for the switchover.

Step 308: Send the troubleshooting policy to a MANO unit in a NFV system.

The network-level troubleshooting policy may instruct the MANO unit to determine a standby network element of the faulty network element and to switch a service carried by the faulty network element to the standby network element.

When receiving the network-level troubleshooting policy, the MANO unit may determine the standby network element of the faulty network element. After determining the standby network element of the faulty network element, the MANO unit may send indication signaling to a VNFM to instruct the VNFM to switch the service carried by the faulty network element to the standby network element. After receiving the indication signaling, the VNFM may switch the service carried by the faulty network element to the standby network element.

It should be further noted that in this embodiment of this application, the KPI information may further include information about a service failure cause, and information about a quantity of service failures caused by the service failure cause. The service failure cause may include a timeout of communication to a downstream network element, resource insufficiency, a timeout of communication between internal modules of a monitored network element, an internal error of software (such as invalidity of internal data of software and code processing entering an abnormal branch), and the like. Therefore, the determining the faulty object according to the KPI information in this application may further include determining the faulty object according to the service failure cause information included in the KPI information.

A percentage of failed services caused by a service processing timeout may be determined according to a quantity of service failures caused by a service processing timeout and a quantity of service requests sent by the monitored network element to a downstream network element that are recorded in the KPI information.

When the percentage of failed services is greater than or equal to a preset threshold, it may be determined that the fault location is the monitored network element. The network element in the network to which the monitored network element belongs may include an external network element of the network element and the network element itself. Accordingly, in this case, the network-level troubleshooting policy may also be used.

In addition, for the previously mentioned homogenized service processing unit, a quantity of service failures caused by resource insufficiency may be excluded and not counted into a total statistical quantity of service failures during collection of statistics about a quantity of service failures. A main cause of this case is that a quantity of services is excessively large and the service processing unit itself is usually not faulty.

This application further provides a troubleshooting apparatus.

Figure 5:
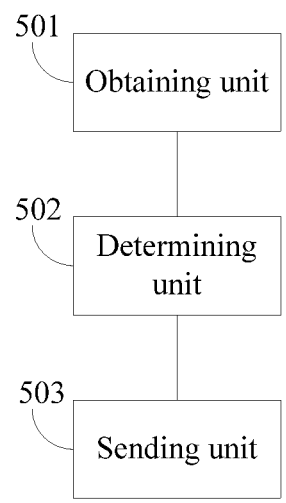
FIG. 5 is a structural diagram of an embodiment of a troubleshooting apparatus according to this application.

FIG. 5 is a structural diagram of an embodiment of a troubleshooting apparatus according to this application. As shown in FIG. 5, the apparatus may include an obtaining unit 501 configured to obtain KPI information of each service processing unit in a monitored network element; a determining unit 502 configured to determine a faulty object according to the KPI information; and determine a troubleshooting policy according to the faulty object; and a sending unit 503 configured to send the troubleshooting policy to a management unit in a NFV system, so that the management unit uses the troubleshooting policy to perform troubleshooting.

In this embodiment, KPI information of each service processing unit in a monitored network element is obtained; a faulty object is determined according to the KPI information; a troubleshooting policy is determined according to the faulty object; and the troubleshooting policy is sent to a management unit in a NFV system. A fault can be located using the KPI information, thereby resolving a problem of relatively low precision in fault locating according to a heartbeat message of a network element. In addition, the troubleshooting policy is determined according to the faulty object, and the troubleshooting policy is sent to the management unit in the NFV system. Therefore, an appropriate troubleshooting policy can be used, which reduces risks caused during a troubleshooting process and mitigates impact on a service during the troubleshooting process.

In actual application, the determining unit 502 may be configured to determine that the faulty object is a service processing unit in the monitored network element; or determine that the faulty object is a communication path between the service processing units; and when the faulty object is the service processing unit in the monitored network element or the communication path between the service processing units, determine a network-element-level troubleshooting policy, where the network-element-level troubleshooting policy is used to perform a troubleshooting operation inside the monitored network element.

In actual application, the determining unit 502 may be configured to determine that the faulty object is the monitored network element; or determine that the faulty object is a communication path between the monitored network element and another network element; and when the faulty object is the monitored network element or the communication path between the monitored network element and the another network element, determine a network-level troubleshooting policy, where the network-level troubleshooting policy is used to perform a troubleshooting operation on one or more network elements in a network in which the monitored network element is located.

In actual application, the determining unit 502 may be configured to calculate, according to a quantity of service requests, received by a service processing unit, in the KPI information, and a quantity of service failures that is corresponding to the quantity of service requests and is in the KPI information, a service success rate of a service performed by a service processing unit; compare the service success rate with a first reference value; and determine that a service processing unit whose service success rate is lower than the first reference value is the faulty object.

In actual application, the determining unit 502 may be configured to compare the service success rate with a preset reference value; or determine an average service success rate of a homogenized service processing unit; subtract a preset value from the average service success rate to obtain a homogenized reference value; and compare the service success rate with the homogenized reference value; where the homogenized service processing unit is a service processing unit that has same service logic as that of a service carried by the service processing unit, and to which the service is discretely allocated.

In actual application, the determining unit 502 may further be configured to, before determining that the service processing unit whose service success rate is lower than the first reference value is the faulty object, determine a first unit set, whose service success rate is greater than the first reference value, in homogenized service processing units; determine a second unit set, whose service success rate is less than the first reference value, in the homogenized service processing units; and determine that a percentage of units included in the first unit set in all the homogenized service processing units is greater than a first preset percentage; where the homogenized service processing unit is a service processing unit that has same service logic as that of a service carried by the service processing unit, and to which the service is discretely allocated.

In actual application, the determining unit 502 may be configured to calculate a service success rate of a communication path according to a quantity that is of service failures caused by a communication path fault and is in the KPI information; compare the service success rate with a third reference value; and determine that a communication path whose service success rate is lower than the third reference value is the faulty object.

In actual application, the determining unit 502 may be configured to collect statistics about a service success rate of each service processing unit according to a quantity of service requests, received by each service processing unit, in the KPI information of each service processing unit, and a quantity of service failures that is corresponding to the quantity of service requests and is in the KPI information of each service processing unit; compare the service success rate with a second reference value; determine a quantity of service processing units whose service success rates are lower than the second reference value; determine, according to the quantity, a percentage of the service processing units, whose service success rates are lower than the second reference value, in all service processing units in the monitored network element; and when the percentage is greater than a second preset percentage, determine that the monitored network element is the faulty object.

In actual application, the determining unit 502 may be configured to compare the service success rate with a preset reference value; or determine an average service success rate of a homogenized network element; subtract a preset value from the average service success rate to obtain a homogenized reference value; and compare the service success rate with the homogenized reference value; where the homogenized network element is a monitored network element that carries a service with same service logic as that of the monitored network element, and to which the service is discretely allocated.

In actual application, the sending unit 503 may be configured to, after it is determined that the faulty object is the service processing unit in the monitored network element or after it is determined that the faulty object is the communication path between the service processing units, send the troubleshooting policy to a system management module in the monitored network element in the NFV system.

In actual application, the sending unit 503 may be configured to, after it is determined that the faulty object is the monitored network element or after it is determined that the faulty object is the communication path between the monitored network element and the another network element, send the troubleshooting policy to a MANO unit in the NFV system.

In actual application, the determining unit 502 may further be configured to, after determining that the faulty object is the service processing unit in the monitored network element, determine that a quantity of faulty service processing units reaches a preset threshold; and determine a network-level troubleshooting policy, where the network-level troubleshooting policy is used to perform a troubleshooting operation on one or more network elements in a network in which the monitored network element is located.

In actual application, the obtaining unit 501 may further be configured to obtain status information of a redundancy network element related to the monitored network element that is determined as the faulty object.

The determining unit 502 may further be configured to determine a redundancy network element in a normal operating state according to the status information; and generate network-level troubleshooting indication information, where the troubleshooting indication information is used to instruct the management unit to replace, with the redundancy network element in the normal operating state, the monitored network element that is determined as the faulty object.

Alternatively, the obtaining unit 501 is further configured to obtain status information of a redundancy network element of a back-end network element in the communication path that is determined as the faulty object.

The determining unit 502 may further be configured to determine a redundancy network element in a normal operating state according to the status information; and generate network-level troubleshooting indication information, where the troubleshooting indication information is used to instruct the management unit to switch the back-end network element corresponding to a front-end network element in the communication path to the redundancy network element in the normal operating state.

In addition, an embodiment of this application further provides a computing node. The computing node may be a host server having a computing capability, a personal computer PC, a portable computer or terminal, or the like. Specific embodiments of this application impose no limitation on specific implementation of the computing node.

Figure 6:
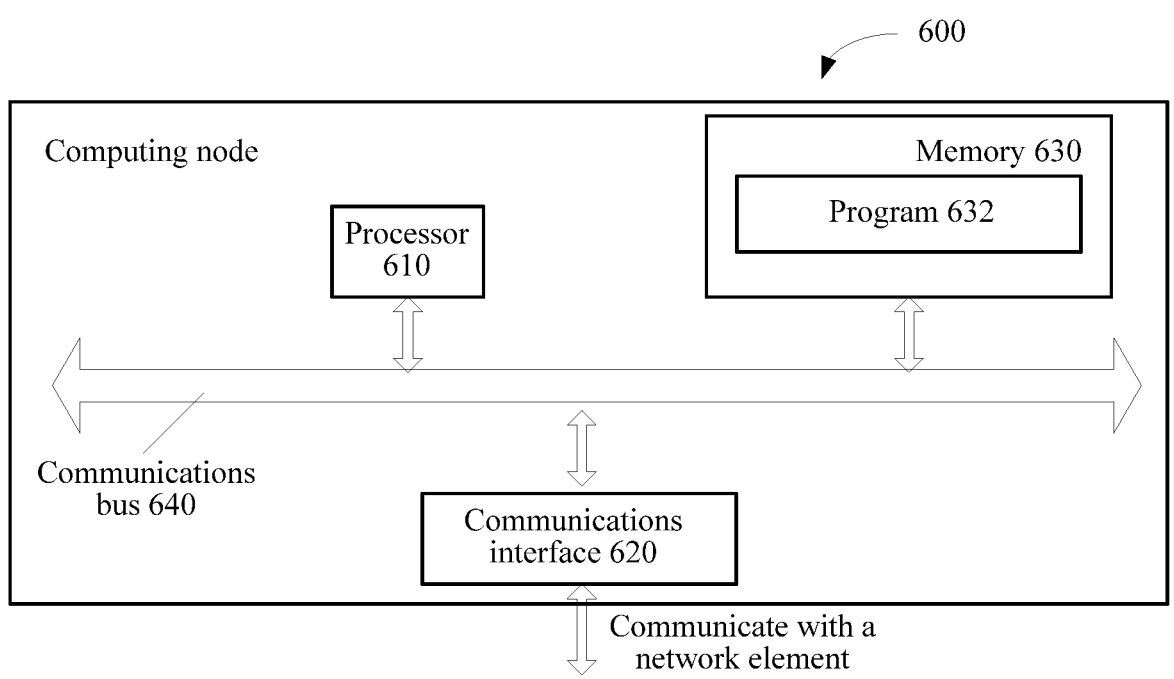
FIG. 6 is a structural diagram of a computing node according to this application.

FIG. 6 is a structural diagram of a computing node according to this application. As shown in FIG. 6, the computing node 600 includes a processor 610, a communications interface 620, a memory 630, and a communications bus 640.

The processor 610, the communications interface 620, and the memory 630 communicate with each other using the communications bus 640.

The processor 610 is configured to execute a program 632.

The program 632 may include program code, and the program code includes a computer operation instruction.

The processor 610 may be a central processing unit (CPU), or an application-specific integrated circuit (ASIC), or one or more integrated circuits configured to implement embodiments of this application.

The memory 630 is configured to store the program 632. The memory 630 may include a high-speed random access memory (RAM), and may further include a non-volatile memory, such as at least one disk memory. The program 632 may include a corresponding module or unit in the embodiment shown in FIG. 5, and details are not described herein.

In the end, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Based on the foregoing descriptions of the embodiments, a person skilled in the art may clearly understand that the present application may be implemented by software in addition to a necessary hardware platform or by hardware only. In most circumstances, the former is a preferred implementation. Based on such an understanding, all or the part of the technical solutions of the present application contributing to the technology in the background part may be implemented in the form of a software product. The computer software product may be stored in a storage medium, such as a read-only memory (ROM)/RAM, a magnetic disk, or an optical disc, and includes several instructions for instructing a computer device, which may be a personal computer, a server, or a network device, to perform the methods described in the embodiments or some parts of the embodiments of the present application.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

Specific examples are used in this specification to describe the principle and implementations of the present application. The foregoing embodiments are merely intended to help understand the method and idea of the present application. In addition, with respect to the implementations and the application scope, modifications may be made by a person of ordinary skill in the art according to the idea of the present application. Therefore, the content of this specification shall not be construed as a limitation to the present application.

What is claimed is:

1. A troubleshooting method, comprising:
   obtaining key performance indicator (KPI) information of each service processor in a monitored network element, wherein the KPI information comprises at least one of a quantity of service requests received by a service processor, a quantity of service failures corresponding to the quantity of service requests, or a cause of each service failure;
   determining a faulty object according to the KPI information, wherein determine the faulty object comprises determining that the faulty object is either a communication path between the monitored network element and another network element or the monitored network element, wherein determining that the faulty object is the monitored network element comprises:
     collecting statistics about a service success rate of each service processor according to a quantity of service requests in the KPI information of each service processor and a quantity of service failures corresponding to the quantity of service requests;
     comparing the service success rate with a second reference value;
     determining a quantity of service processor whose service success rates are lower than the second reference value;
     determining, according to the quantity of service processors, a percentage of the service processors, whose service success rates are lower than the second reference value, in all service processors in the monitored network element; and
     determining that the monitored network element is the faulty object when the percentage is greater than a second preset percentage;
   determining a troubleshooting policy according to the faulty object by determining a network-level troubleshooting policy, and wherein the network-level troubleshooting policy is used to perform a troubleshooting operation on one or more network elements in a network in which the monitored network element is located; and
   sending the troubleshooting policy to a management unit in a network function virtualization (NFV) system.

2. The method according to claim 1, wherein comparing the service success rate with the second reference value comprises:
   determining an average service success rate of a homogenized network element;
   subtracting a preset value from the average service success rate to obtain a homogenized reference value; and
   comparing the service success rate with the homogenized reference value,
   wherein the homogenized network element is a monitored network element that carries a service with same service logic as that of the monitored network element and to which the service is discretely allocated.

3. A troubleshooting method, comprising:
   obtaining key performance indicator (KPI) information of each service processor in a monitored network element, wherein the KPI information comprises at least one of a quantity of service requests received by a service processor, a quantity of service failures corresponding to the quantity of service requests, or a cause of each service failure;
   determining a faulty object according to the KPI information by determining that the faulty object is either a communication path between service processors or a service processor in the monitored network element, wherein determining that the faulty object is the service processor in the monitored network element comprises:
     calculating, according to the quantity of service requests in the KPI information, and a quantity of service failures corresponding to the quantity of service requests in the KPI information, a service success rate of a service performed by a service processor;
     comparing the service success rate with a first reference value; and
     determining that a service processor whose service success rate is lower than the first reference value is the faults object;
   determining a troubleshooting policy according to the faulty object by determining a network-element-level troubleshooting policy, wherein the network-elementlevel troubleshooting policy is used to perform a troubleshooting operation inside the monitored network element; and sending the troubleshooting policy to a management unit in a network function virtualization (NFV) system.

4. The method according to claim 3, wherein comparing the service success rate with the first reference value comprises:
determining an average service success rate of a homogenized service processor,
subtracting a preset value from the average service success rate to obtain a homogenized reference value; and
comparing the service success rate with the homogenized reference value,
wherein the homogenized service processor is a service processor that has same service logic as that of a service carried by the service processor, and to which the service is discretely allocated.

5. The method according to claim 3, wherein before determining that the service processor whose service success rate is lower than the first reference value is the faulty object, the method further comprises:
determining a first unit set in homogenized service processors whose service success rate is greater than the first reference value;
determining a second unit set in the homogenized service processors whose service success rate is less than the first reference value; and
determining that a percentage of units that are art of the first unit set in all the homogenized service processors is greater than a first preset percentage,
wherein the homogenized service processor is a service processor that has same service logic as that of a service carried by the service processor; and to which the service is discretely allocated.

6. The method according to claim 3, wherein determining that the faulty object is the communication path between the service processors further comprises:
calculating a service success rate of a communication path according to a quantity that is of service failures caused by a communication path fault and is in the KPI information;
comparing the service success rate with a third reference value; and
determining that a communication path whose service success rate is lower than the third reference value is the faulty object.

7. The method according to claim 3, wherein after determining that the faulty object is the service processor in the monitored network element or after determining that the faulty object is the communication path between the service processors, sending the troubleshooting policy to a management unit in a NFV system further comprises sending the troubleshooting policy to a system management module in the monitored network element in the NFV system.

8. A troubleshooting apparatus, comprising:
a transceiver,
one or more processors coupled to the transceiver, and
a non-transitory computer-readable storage-medium coupled to the one or more processors and comprising instructions that when executed by the one or more processors cause the one or more processors to:
obtain key performance indicator (KPI) information of each service processor in a monitored network element, wherein the KPI information comprises at least one of a quantity of service requests received by a service processor, a quantity of service failures corresponding to the quantity of service requests, or a cause of each service failure;
determine a faulty object according to the KPI information;
determine a troubleshooting policy according to the faulty object;
send the troubleshooting policy to a management unit in a network function virtualization (NFV) system;
determine that the faulty object is one of the monitored network element or a communication path between the monitored network element and another network element;
determine a network-level troubleshooting policy, wherein the network-level troubleshooting policy is used to perform a troubleshooting operation on one or more network elements in a network in which the monitored network element is located;
collect statistics about a service success rate of each service processor according to a quantity of service requests in the KPI information of each service processor and a quantity of service failures corresponding to the quantity of service requests;
compare the service success rate with a second reference value;
determine a quantity of service processors whose service success rates are lower than the second reference value;
determine, according to the quantity, a percentage of the service processors, whose service success rates are lower than the second reference value, in all service processors in the monitored network element; and
determine that the monitored network element is the faulty object when the percentage is greater than a second preset percentage.

9. The apparatus according to claim 8, wherein the instructions further cause the one or more processors to:
determine an average service success rate of a homogenized network element;
subtract a preset value from the average service success rate to obtain a homogenized reference value; and
compare the service success rate with the homogenized reference value,
wherein the homogenized network element is a monitored network element that carries a service with same service logic as that of the monitored network element and to which the service is discretely allocated.

10. A troubleshooting apparatus comprising:
a transceiver;
one or more processors coupled to the transceiver; and
a non-transitory computer-readable storage-medium coupled to the one or more processors and comprising instructions that when executed by the one or more processors cause the one or more processors to:
obtain key performance indicator (KPI) information of each service processor in a monitored network element, wherein the KPI information comprises at least one of a quantity of service requests received by a service processor, a quantity of service failures corresponding to the quantity of service requests, or a cause of each service failure;
determine a faulty object according to the KPI information;
determine a troubleshooting policy according to the faulty object;
send the troubleshooting policy to a management unit in a network function virtualization (NFV) system;

determine that the faulty object is one of a service processor in the monitored network element or a communication path between service processors;

determine a network-element-level troubleshooting policy when the faulty object is the service processor in the monitored network element or the communication path between the service processors, wherein the network-element-level troubleshooting policy is used to perform a troubleshooting operation inside the monitored network element;

calculate, according to a quantity of service requests in the KPI information and a quantity of service failures corresponding to the quantity of service requests, a service success rate of a service performed by a service processor;

compare the service success rate with a first reference value; and determine that a service processor whose service success rate is lower than the first reference value is the faulty object.

11. The apparatus according to claim 10, wherein the instructions further cause the one or more processors to:

determine an average service success rate of a homogenized service processor;

subtract a preset value from the average service success rate to obtain a homogenized reference value; and compare the service success rate with the homogenized reference value, wherein the homogenized service processor is a service processor that has same service logic as that of a service carried by the service processors and to which the service is discretely allocated.

12. The apparatus according to claim 10, wherein the instructions further cause the one or more processors to:

determine a first unit set, whose service success rate is greater than the first reference value, in homogenized service processors before determining that the service processor whose service success rate is lower than the first reference value is the faulty object;

determine a second unit set, whose service success rate is less than the first reference value, in the homogenized service processors; and determine that a percentage of units comprised in the first unit set in all the homogenized service processors is greater than a first preset percentage, wherein the homogenized service processor is a service processor that has same service logic as that of a service carried by the service processor; and to which the service is discretely allocated.

13. The apparatus according to claim 10, wherein the instructions further cause the one or more processors to:

calculate a service success rate of a communication path according to a quantity that is of service failures caused by a communication path fault and is in the KPI information;

compare the service success rate with a third reference value; and determine that a communication path whose service success rate is lower than the third reference value is the faulty object.

14. The apparatus according to claim 10, wherein the instructions further cause the one or more processors to send the troubleshooting policy to a system management module in the monitored network element in the NFV system after the faulty object is the service processor in the monitored network element or after the faulty object is the communication path between the service processors.

* * * * *

UNITED STATES PATENT AND TRADEMARK OFFICE
CERTIFICATE OF CORRECTION

PATENT NO. : 10,601,643 B2
APPLICATION NO. : 15/928367
DATED : March 24, 2020
INVENTOR(S) : Wenge Zhang et al.

It is certified that error appears in the above-identified patent and that said Letters Patent is hereby corrected as shown below:

Claim 4, Column 21, Line 10: "service processor," should read "service processor;"

Claim 4, Column 21, Line 17: "processor, and to which" should read "processor and to which"

Claim 5, Column 21, Line 29: "that are art of" should read "that are part of"

Claim 5, Column 21, Line 34: "processor; and to which" should read "processor and to which"

Claim 8, Column 21, Line 57: "a transceiver," should read "a transceiver;"

Claim 8, Column 21, Line 58: "transceiver, and" should read "transceiver; and"

Claim 11, Column 23, Line 31: "service processors" should read "service processor"

Claim 12, Column 24, Line 14: "processor; and to which" should read "processor and to which"

Signed and Sealed this
Second Day of June, 2020

Andrei Iancu
*Director of the United States Patent and Trademark Office*